March 10, 1953 G. T. HART 2,631,223
APPARATUS FOR HIGH-FREQUENCY DIELECTRIC
PROGRESSIVE BONDING
Filed June 28, 1946 4 Sheets-Sheet 1
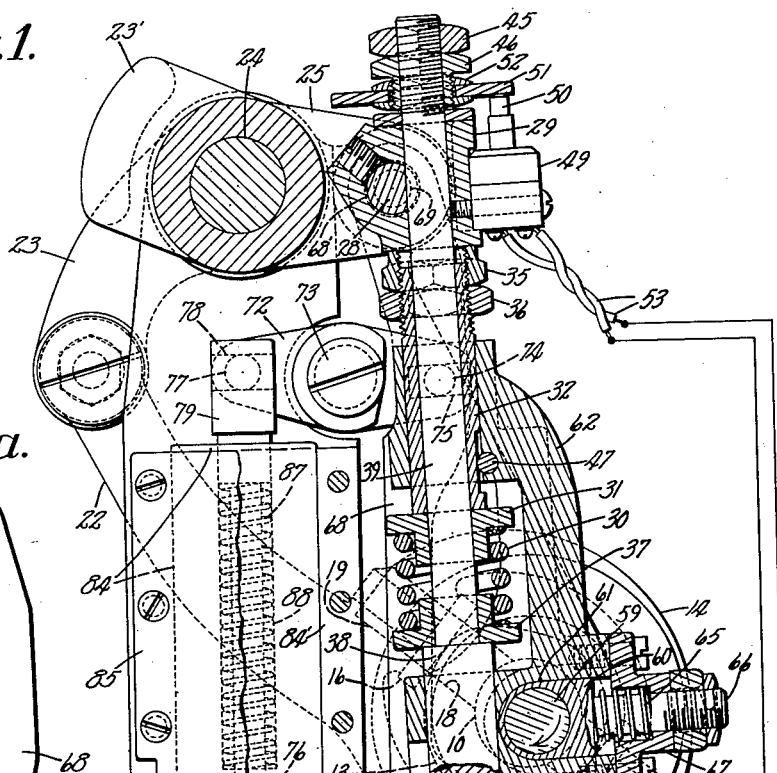
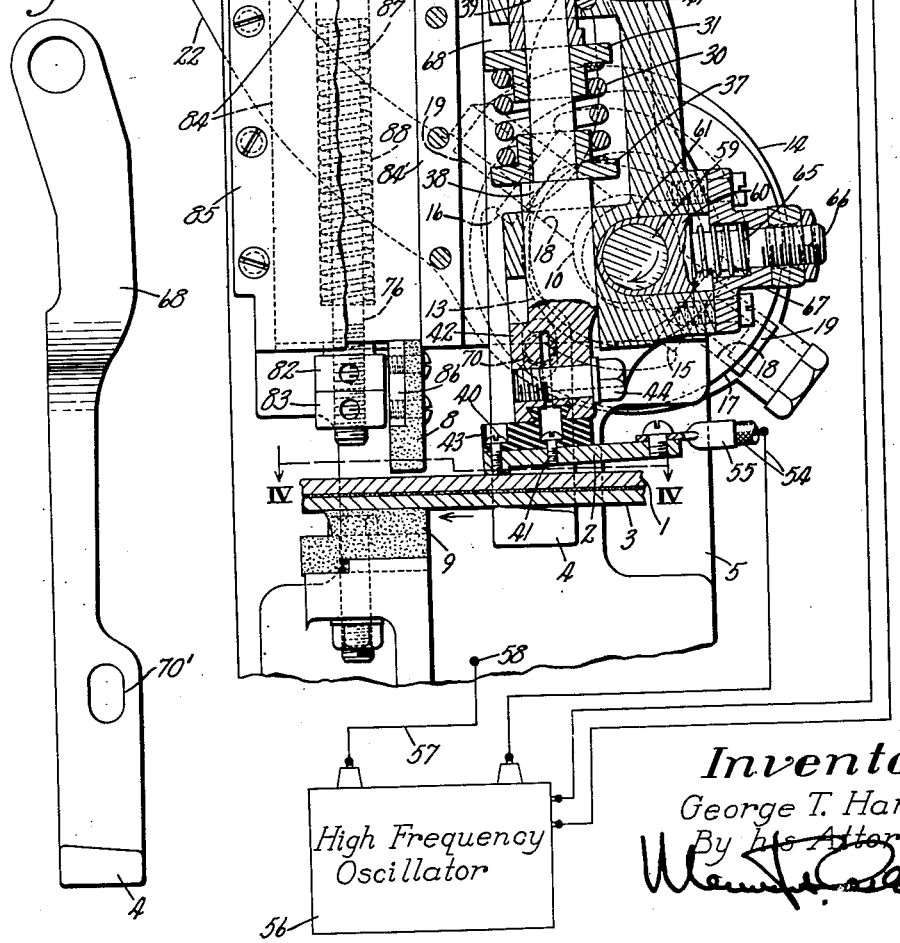
Inventor
George T. Hart
By his Attorney March 10, 1953 G. T. HART 2,631,223
APPARATUS FOR HIGH-FREQUENCY DIELECTRIC
PROGRESSIVE BONDING
Filed June 28, 1946 4 Sheets-Sheet 2

Inventor
George T. Hart
By his Attorney

Inventor
George T. Hart
By his Attorney

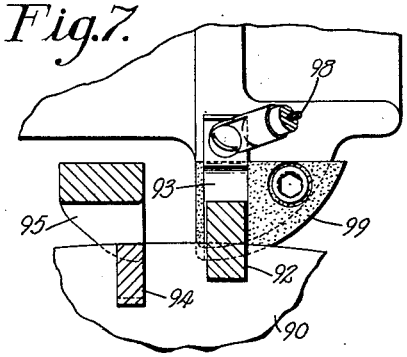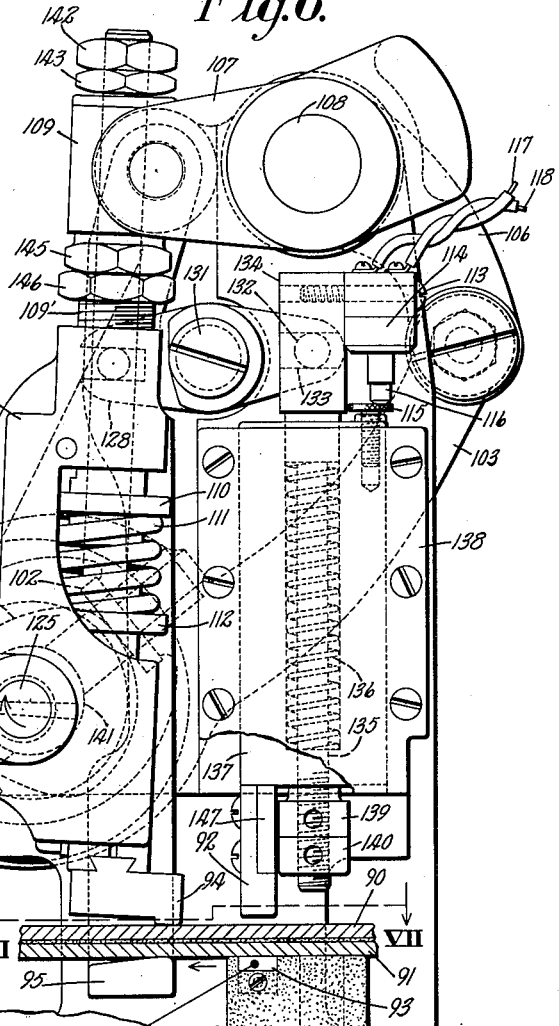
Inventor
George T. Hart
By his Attorney

Patented Mar. 10, 1953

2,631,223

UNITED STATES PATENT OFFICE 2,631,223

APPARATUS FOR HIGH-FREQUENCY DIELECTRIC PROGRESSIVE BONDING

George T. Hart, Lynn, Mass., assignor to United Shoe Machinery Corporation, Flemington, N. J., a corporation of New Jersey Application June 28, 1946, Serial No. 679,994

7 Claims. (Cl. 219—47)

This invention relates to the bonding of objects of thermoactive materials or objects coated with thermoactive adhesives. More particularly, the invention relates to improvements in apparatus for bonding such objects progressively and is herein illustrated by reference to the bonding progressively of shoe parts such as outsoles and welts, as in shoes of the Goodyear welt type. It is to be understood, however, that in its various novel and useful aspects the invention is not thus limited in its applicability.

As is well known, recent development in the manufacture of synthetics have provided a number of new thermoplastic and thermosetting materials especially useful in such durable articles as raincoats, waterproof bags, aprons, and the like, and in thermoactive cements useful for bonding together articles having component parts of leather or of similar substances. In the manufacture of such articles it has been proposed to heat the parts, or the adhesives, until plastic or tacky in localized areas and to apply pressures to the heated areas, repeating the operation progressively over the regions to be bonded. For such purposes high-frequency electric heating has been preferred to conduction heating wherein the work is pressed between heated platens, because with the latter method the temperature in the material tends to become disadvantageously high at the outer surfaces, whereas with the former method heating takes place uniformly throughout the material.

It is known, for example, that a seam or bond may be formed between such materials by passing them between roller or wheel electrodes supplied with energy from a high-frequency oscillator, but with some materials this causes a stretching and wrinkling of the work. Further the operating speed is seriously limited because the shape of the electrodes provides only a limited area of instantaneous contact and hence a relatively low effective time of exposure of any given portion of the bonding path to the maximum electric field. Also this shape is conducive to voltage arc-over and precludes the use of relatively high voltages. Such considerations make apparent the advantages generally of gripping members over roller members in progressive bonding. Although it is also known to bond such objects as precemented shoe parts by such gripping electrodes, customarily the parts continue to be gripped between the electrodes for the necessary "dwell-time" after the heating period, for example, while the cement sets sufficiently to resist the "fight" of the leather, thus seriously limiting production by extending the period of use of and hence "tying-up" the electrodes. Known devices are limited also in their speed of operation and in the degree of control afforded the operator, particularly in their application to leather shoe parts and the like which are usually inherently stiff and of irregular shapes.

Accordingly, among the objects of the present invention is the provision of apparatus for progressively bonding or otherwise operating upon dielectric work pieces, with the application of a high-frequency electric field and of pressure, in which higher operating speeds may be achieved.

Another object is the provision of apparatus for treating objects comprising thermoactive dielectric materials progressively along a selected path, as for the formation of a seam or bond, by the application of such a field and of pressure successively to respectively overlapping fractional areas along a common path wherein a fractional area is heated for a period while engaged by gripping members and subsequently an area overlapping said fractional area is placed under pressure by separate elements as the thermoactive material thus heated cools or becomes set.

Still another object of the invention is to devise apparatus wherein each of successive fractional areas of work parts previously heated by subjection to a high-frequency field from a set of members embodying an electrode is subjected to pressure during an interval of dwell-time by means of a separate set of coacting members.

A feature of the invention resides in apparatus embodying two pairs of work contacting members alternately operative to engage the work in areas which overlap along a common path with electrodes embodied in one pair. Conveniently, it may be that the electrode pair is operative to feed the work, the other pair being operated to engage the work from a stationary position forward of the electrodes (considered with respect to the direction of feeding movement) for applying pressure to the work. Alternatively, the reverse may be preferred, wherein the work is fed by work pressing members and the electrode members reciprocate at a position to the rear.

Another feature of the invention resides in a circuit and switching means provided for controlling a high-frequency oscillator for energizing the electrodes only during a part of the interval of their engagement with the work, and in a more limited respect invention resides in such switching means actuated during the yielding of a spring which is operative to determine the pressure of contact of the electrode members against the work. This feature has been made the subject of, and is claimed in, a divisional application, Serial No. 324,964, filed December 9, 1952, in the name of George H. Hart, deceased.

The foregoing and other features and advantages of the invention will be appreciated more fully from the following description and accompanying drawings and will thereafter be pointed out in the appended claims.

In the drawings,

Fig. 1 is a sectional front elevation of a bonding machine embodying electrodes which periodically feed the work while it is being heated and work holding members which grip the heated work parts together in the intervening periods;

Fig. 1a is a front view of a swinging arm carrying a lower electrode of the above machine;

Figures 5A, 5B, 5C, 5D:
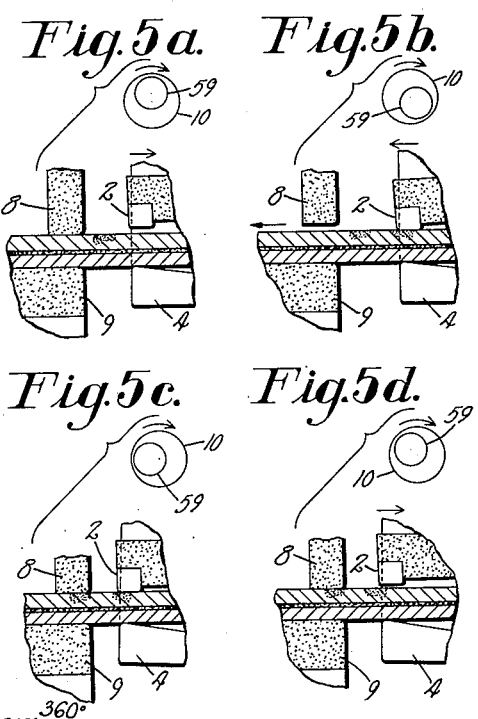
Figure 5E:
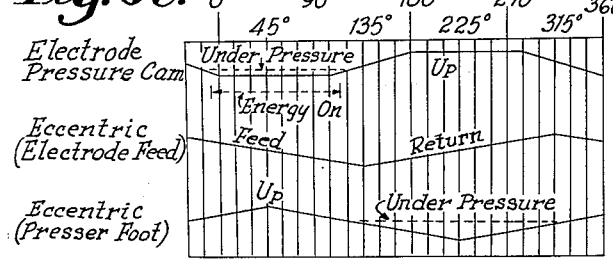

Figs. 5a to 5d inclusive are views in elevation of the work-handling members of the machine illustrating the positional relationships thereof at different points in their cycle of movement, the work being shown in vertical section;

Fig. 5e is a cam chart showing the timing of the driving action of a cam and an eccentric in operating the work-handling members;

Fig. 6 is a front elevation of a modified bonding machine wherein the electrode members are reciprocatory, and wherein the work-holding and feeding members engage the work to advance it during the periods while the electrodes are apart;

Fig. 7 is a sectional plan view of the work handling members of the machine of Fig. 6; and Figs. 8a to 8d inclusive are views in elevation of such members in positions characteristic of different points in their cycle of movement.

In Figs. 1, 2, 3 and 4, the invention is shown embodied in a machine wherein electrode members 2, 4, are adapted for feeding the work and work-holding members 8, 9, are reciprocatory at a location forward of the electrode members. Such members are shown operatively engaging the welt and outsole of a shoe in the process of manufacture with a layer of thermoactive adhesive between them. It will be understood that either or both the welt and sole may be of synthetic material if desired. The outsole 1 is being engaged by an insulated upper electrode 2 and the welt 3 is being engaged by a lower electrode 4 which is grounded electrically to the frame 5 of the machine. Vertical movements of the electrode 2 are controlled by a driven cam 13, to be later described, while lateral movements are imparted by an eccentric 59, both on a driven shaft 10. In their indicated positions the upper electrode 2 has just descended upon the work preparatory to imparting thereto a right-to-left motion, and the presser foot 8, comprising one of the work-holding members, has just left the work. In opposable position to the presser foot 8, a lower member 9, comprising the other work-holding member, is bolted rigidly to the frame of the machine.

Movement of the electrodes 2, 4 and the presser foot 8 relative to that of the eccentric 59 is illustrated by several positional views of such members. In Fig. 5a the work is shown held firmly between the presser foot 8 and the supporting member 9 while the electrode members 2 and 4, separated, are at the half-way position in their return left-to-right movement, as indicated by the position of the eccentric 59. In Fig. 5b the presser foot 8 has released the work and the electrode members 2 and 4 have closed upon the work and begun their right-to-left feeding movement bodily carrying the work along with them as indicated by the arrow and the changed position of the "imperfections" in the upper layer of the work. In Fig. 5c the electrode members are shown as having just arrived at their leftmost position and are about to separate from the work, the presser foot 8, in accordance with a feature of the invention, having just descended and engaged the work in an area previously heated to provide a dwell period pressure for the adhesive to cool and set. In Fig. 5d the electrode members have separated and started on their return movement to the right.

Figure 2:
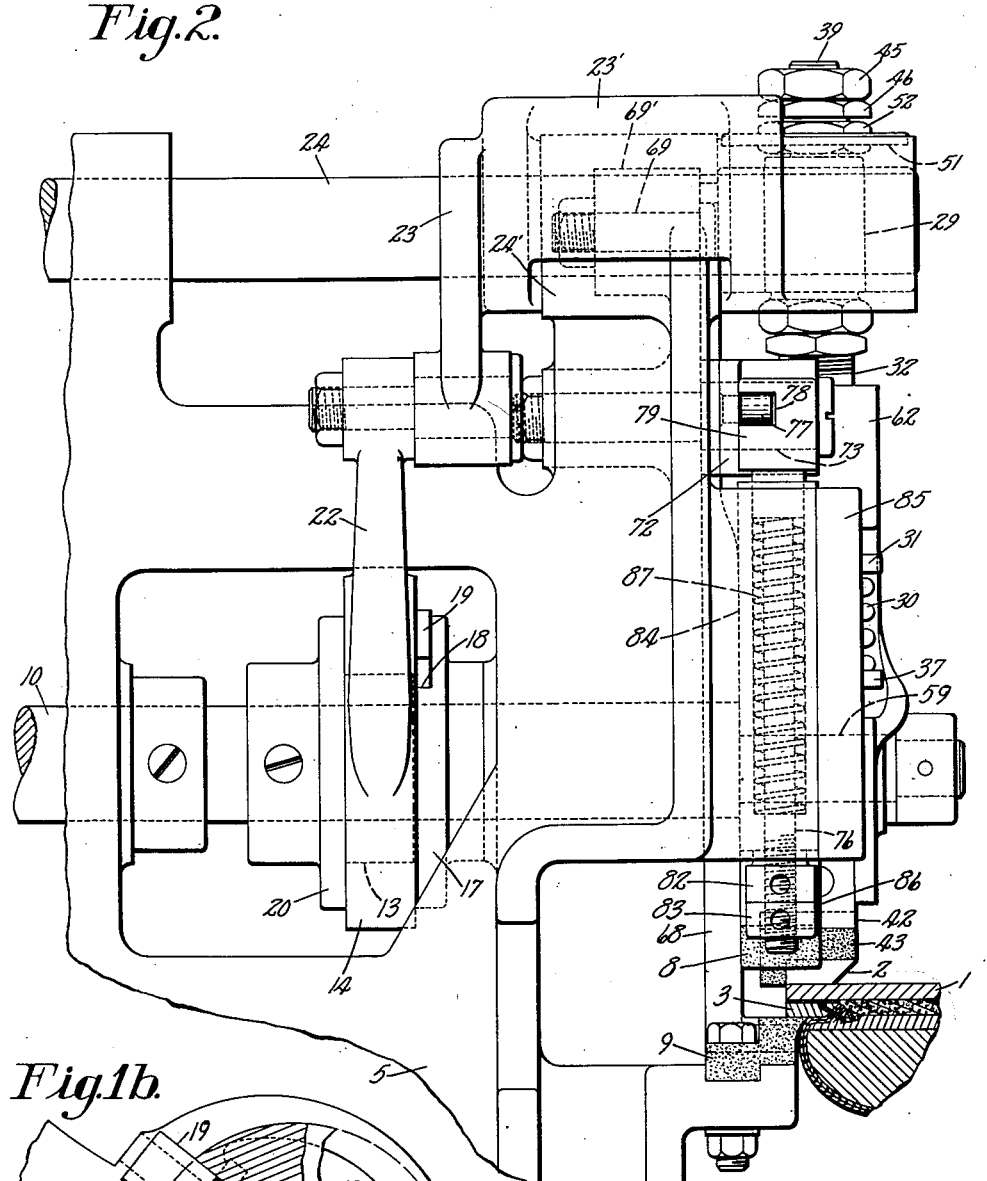
Fig. 2 is a partial left side elevation of the machine.
Figure 1B:
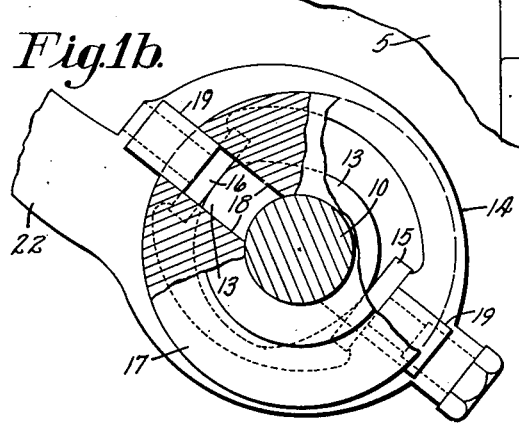
Fig. 1b is a front view principally of a cam, cam housing and drive shaft of the same machine.
Figure 3:
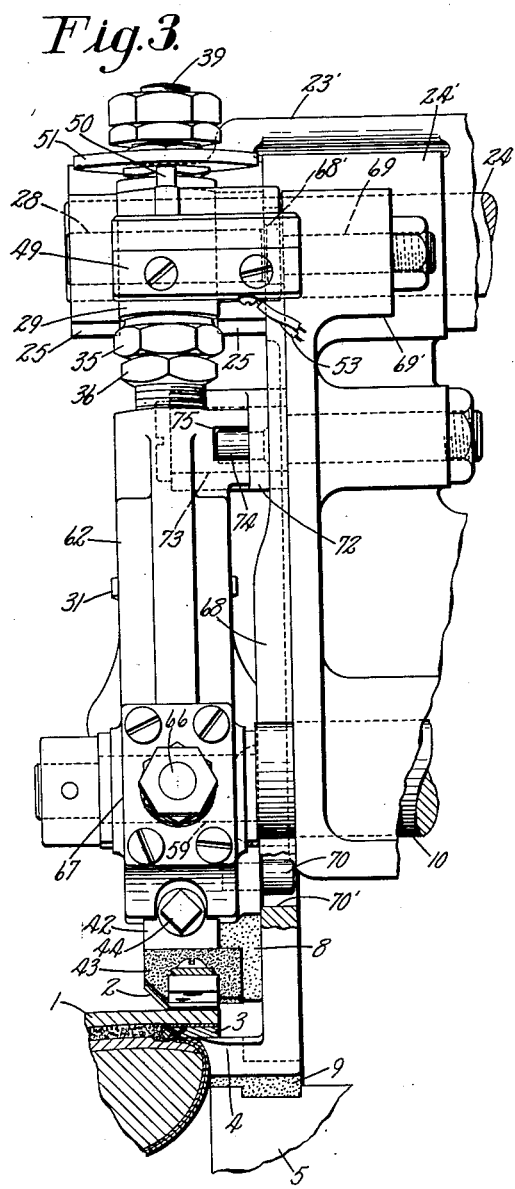
Fig. 3 is a partial right side elevation of the machine.

As to the matter of imparting vertical movement to electrode 2, driving power is imparted to the shaft 10 journaled in the frame 5 of the machine, which shaft carries the cam 13 retained in a cam housing 14 (Fig. 1b). Inside the cam housing a pair of inwardly projecting plates 15 and 16 engage the peripheral surface of the cam 13. The cam housing 14 is retained in position lengthwise of the shaft 10 by means of a circular end plate 20 (Fig. 2) and a corresponding circular plate 17 abutting respectively against the back and front sides of said housing. The circular plate 17 has an inclined groove 18 arranged for slidable engagement with an inclined diametral key or ridge 19 projecting from the front side of the cam housing 14, serving to guide the housing in its oscillatory movement which is derived from rotation of the cam. Such movement is conveyed through driving link 22 to an upper offset rocker arm 23 pivoted on an overhead shaft 24. Integral with the offset rocker arm 23, and bridging the front bearing 24' for the shaft 24, is a yoke 23' joining the rocker arm 23 to an overhanging bifurcated arm 25 (Fig. 3) connected by pin 28 to an upper collar 29 which rises and falls cyclically with rotation of the cam. A sleeve 32 receives the cyclic downward thrust of the upper collar 29 upon adjustment nuts 35 and 36 which are threaded onto the upper end of such sleeve and these thrusts are transmitted, through a loaded spring 30 which is engaged at its upper end by a flanged member 31 abutting against the bottom end of the sleeve 32, to a vertical rod 39 slidable inside the collar 29 and sleeve 32 axially thereof and carrying at its lower end the upper electrode 2. The lower end of the spring engages a flanged member 37 which is seated on a shoulder 38 of the vertical rod 39. Sleeve 32, in turn, slides inside a yoke member 62, as does the lower section 38 of the rod 39. The sleeve 32 is prevented from turning by the action of a pin 47 inserted through the yoke 62 and bearing against a flattened portion of the sleeve. The shouldered portion 38 has a lower portion 42 which is rectangular in section and which is slotted and dovetailed at the bottom thereof, as shown, to receive and hold the electrode assembly, particularly an insulating member 43 on which is mounted, by means of screws 40 and 41, the electrode 2. A clamp bolt 44 provides the gripping force necessary to hold securely the electrode assembly when inserted into the dovetail.

As the collar 29 descends, as soon as resistance to downward movement of the electrode 2 exceeds the loading of the spring 30, the spring yields, allowing relative vertical movement between the collar 29 and the rod 39. The tension of the spring 30 accordingly determines the gripping pressure of the electrode members 2 and 4 against the work 1, 3, and adjustment thereof is made by precompressing the spring by means of take-up nuts 45 and 46, which are carried at the upper end of the longitudinal rod 39 and cooperate with the upper end of collar 29, and the nuts 35 and 36 on the sleeve 32. Adjustment also may be made by means of these nuts to raise and lower the normal or rest position of the upper electrode member 2 for accommodating different work thicknesses. It will be seen that there is thus provided between the collar 29 and the rod 39 a spring-biased lost-motion connection whose action may be varied by the foregoing adjustments.

To provide for supplying high-frequency power to the electrode members only when they are in firm engagement with the work, a switch 49 is mounted on the side of the upper collar 29. This switch, which may be of the type known as "microswitch," has a plunger 50 adapted, upon very short movement, for opening and closing the switch contacts depending on whether the plunger is either depressed against the pressure of a spring contained in the switch box or allowed to assume an extended position. The plunger 50 is actuated by a circular plate 51 mounted on the upper end of rod 39 by means of a threaded neck portion forming part of nut 46 and a pair of nuts 52 located on said neck portion. The vertical position of the circular plate 51 is adjustable on said rod 39 by adjusting the nuts 52 as well as by a repositioning of the nut 46. Switching action may accordingly be performed by the relative movement between the circular plate 51 and the switch box 49, which takes place during yielding of the spring 30. On the down-stroke of the electrode 2, an oscillator 56 is made operative by the switch when the spring 30 yields; and on the up-stroke, the reverse switching action takes place. The electrodes are thereby supplied with high-frequency energy only during the times when they exert more than a predetermined pressure against the work, and activation of the cement material between the sole 1 and the welt 3 takes place under the pressure of the electrodes as is usually preferable.

The electrical connections shown include a pair of wires 53 running from the switch contacts to the high-frequency oscillator 56 and are connected in a circuit (not shown) associated with the oscillator which circuit is adapted to turn the latter on and off. High-frequency power from the oscillator is conducted to the upper electrode member 2 through an insulated cable 54 having a connecting lug 55 screwed to a lateral extension of the electrode 2, and through a grounding wire 57 connected between the oscillator ground terminal and a point 58 on the frame of the machine.

Lateral movement is imparted to the electrode member 2 by the action of the eccentric 59 carried at the front end of the main drive shaft 10. The eccentric rotates in a U-shaped block 60 (Fig. 1) which is in slidable engagement with a U-shaped slot 61 in the yoke member 62. As the eccentric rotates, the yoke member 62 is moved laterally back and forth through the action of the block 60 which, in one direction of movement, bears against the end of the slot 61 and, in the other, against a spring 65. The spring 65 encircles a bolt 66 projecting outwardly from the block 60 through a cover plate 67 bolted to the side of yoke 62 and the outer end of the spring is seated against the bottom of a recess in the cover plate 67. From the rotational motion of the eccentric 59 the yoke 62 derives not only the desired rocking transverse work-feeding motion but additionally receives a vertical component of motion which latter motion is superfluous and is therefore taken up by the sliding action of the yoke 62 on the sleeve 32 and the enlarged section 38 relative to the rod 39.

The lower electrode 4 is formed by the foot of an L-shaped arm 68 (Fig. 1a) which is swingably suspended by the head 69' (Fig. 3) of a pin 69 carried by a boss 69' in the frame of the machine directly behind the bifurcated arm 25. Lateral movement is given the arm 68, in such manner that the electrode 4 remains directly beneath the opposing upper electrode 2, by means of a pin 70 in yoke 62 projecting rearwardly into a slot 70' (Fig. 3) in the arm 68.

The presser foot 8 is carried by a downwardly projecting lug 86 from the bottom end of a slide member 84 which is slidably retained in a guideway 84' on the front of the frame by a cover 85 held by screws. The slide member 84 and thus the presser foot 8 receive vertical movement through the action of a lever 72 pivoted about a pin 73 inserted into the front of the frame. Carried at one end of the lever 72, a pin 74 (Fig. 3) engages a slot 75 recessed into the upper back portion of the yoke 62 thereby rocking the lever in accordance with vertical movements of the yoke. Another pin 77 (Fig. 2) at the other end of the lever 72 engages a slot 78 recessed into the head section 79 of a rod 76 slidable in the slide member 84 and raises and lowers the rod in accordance with pivotal movements of the lever. On the upward motion of the rod 76, stop collars 82 and 83 threaded on the lower end of the rod 76 bear against the slide member 84, lifting the latter positively; and on the down motion, a yielding downward force is provided the presser foot through compression of a spring 87 which at its upper end bears against a shoulder of the rod 76, and at its lower end bears against an annular ledge of the slide member 84. The spring 87 may be adjustably precompressed or loaded by means of the threaded stop collars 82 and 83.

It is preferred, although not essential, to construct the presser foot 8 of insulating material since it thereby tends to minimize deflection of the high-frequency field existing between the electrodes, especially when the latter are approaching the presser foot 8 in their leftward travel to the position shown in Fig. 5c, forward in the direction of feeding movement. The same is true of support member 9. Suitable for this purpose are Bakelite, hard rubber or other such materials of appropriate strength and wear resistant qualities.

Figure 4:
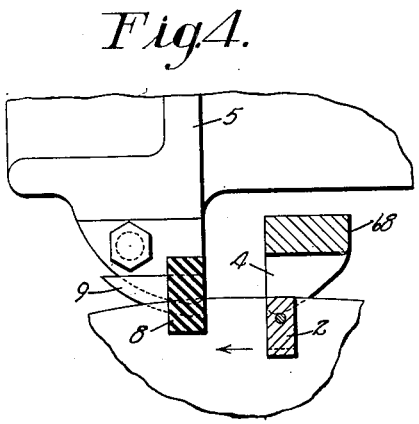
Fig. 4 is a partial sectional plan view taken on the line IV—IV in Fig. 1, and illustrating the work engaging surfaces of the electrodes and work-holding members of the machine.

The lower electrode member 4 and the lower supporting member 9 have outwardly extending curved shoulder portions (Figs. 2 and 3) adapted for slidable engagement with the welt crease of the shoe; and, as illustrated in Fig. 4, these members are rounded off at the sides thereof to facilitate free sliding movement of the shoe lengthwise of the crease with respect to these members.

In order for the work to be held securely between the electrode members for movement of the work, the welt engaging surface of the lower electrode 4 is tapered (Fig. 1), being highest at its forward edge, which is directly beneath the upper electrode 2, and sloping off therefrom gently toward the trailing edge. The heavily shaded sections in Fig. 4 represent the work engaging areas viewed in a cross-section of the upper electrode 2 and the presser foot 3. The inside surface of the electrode member 2 is shown substantially flush with the outside edge of the welt and outsole.

Fig. 5e shows the time relationship, in degrees of an operating cycle, between the movements produced by the cam 13 and the eccentric 59 in operating the electrode and the presser foot. The reference, or 0°, position is taken as that shown in Fig. 1.

It has been found convenient to maintain the electrodes at maximum closing pressure, with the spring 30 compressed the full amount, during approximately 106° of the cam rotation cycle, allowing 74° thereof for separating the upper electrode 2 from the work, 106° for returning the electrodes to their starting position and 74° for lowering the electrode 2 against the work and in creating full closing pressure between the electrodes. It is to be noted that during a substantial portion of the latter 74° period allowed for closure of the electrodes, progressive yielding occurs in the spring 30; the reverse is true of the former 74° period during which the electrodes are being separated from the work. To prevent slack movement of the cam housing with its plates 15 and 16, all diameters of the cam through the axis of shaft 10 are made equal, and are slightly less than the distance between the plates 15 and 16. Means (not shown) may be provided for angular adjustment of the cam with respect to the drive shaft 10 for proper cycling of the cam with respect to the eccentric 59.

It will be observed from Fig. 5e that the switching of the high-frequency energy occurs during change of pressure upon the electrodes so that the energy is supplied to the electrode only while it is engaging the work under pressure. Also the diagram illustrates the advantage of the herein described arrangement of work-handling members in providing, for the previously heated areas by means of the presser foot, a dwell period under pressure which extends for some 210° of the machine cycle. This period, if provided by the electrodes in addition to their other periods, would extend the cycle period by about 58% and accordingly slow the step rate appreciably.

In the alternative embodiment of the invention, featuring reciprocatory electrodes and four-motion work-feeding members, as illustrated in Fig. 6 and partly in Fig. 7, many features are employed in common with the foregoing machine of Fig. 1; and many of the remaining features are exactly the reverse of the corresponding features in that machine.

In Fig. 6 an outsole 90 and welt 91, with an interposed layer of thermoactive adhesive, are shown in position between electrode members 92 and 93 and being engaged by work-feeding members 94 and 95. The upper electrode member 92 is grounded to the frame of the machine and undergoes movements similar to those of the presser foot 3 of Fig. 1; whereas the lower insulated electrode member 93 is connected to the high-frequency oscillator 119 through wire 98 and is embedded in, and substantially flush with, the upper surface of an insulating, supporting block 99, and, together with the block 99, serves a similar mechanical function to that of the support member 9 in that figure. The block 99 is mounted on the frame of the machine by means of a bolt 97. The work is fed intermittently by the work-feeding members 94 and 95 which are the mechanical counterparts of the corresponding electrode members 2, 4 in Fig. 1.

Motion is imparted to the foregoing members 94, 95 by means similar to the mechanism in Fig. 1, including a cam 100, opposing cam plates 101, 102, a link 103, and an upper off-set rocker arm 106, the latter including a bifurcated arm 107 which is pivoted on a shaft 108. Correspondingly, an upper collar 109 carried by the bifurcated arm 107 transmits downward thrusts through a sleeve 109', a flanged member 110 and a spring 111 bearing against the lower flanged member 112 thereby yieldably pressing the upper feed member 94 against the work. Horizontal movement is imparted to the work-feeding members 94 and 95 through the action of an eccentric 125 and a U-shaped member 126 swinging a yoke 127 pivoted on the collar 109.

The upper electrode member 92 receives its up-and-down motion through the action of a lever 128 which is pivoted to swing about a mounting pin 131. One end of the lever 128 carries a pin 132 which engages a slot 133 in head member 134 of a vertical rod 135. A spring 136 and stop collars 139 and 140 associated with the rod 135 function similarly to the corresponding members in the machine of Fig. 1 and provide a spring-biased lost-motion connection to a sliding member 137, which is held in a guideway by a cover 138 attached to the frame of the machine, and has a downwardly projecting lug 141 to which is bolted an upper electrode 92 which is electrically grounded to the frame of the machine.

In the manner of the former machine, the cyclic movements of the parts are derived through the rotation of the cam 100 and the eccentric 125. Four representative positions of the work-engaging members are shown with reference to the position of the eccentric 125. In Fig. 8a, the work-feeding members 94 and 95, in separated position, have nearly reached their rear or rightmost position preparatory to closing upon the work; and the electrode members 92 and 93 are shown gripping the work but are about to separate. In Fig. 8b, the electrode members have separated and the work-feeding members have gripped the work preparatory to advancing the work to the left. In Fig. 8c, the electrode members have again descended upon the work and the work-feeding members are about to separate therefrom and return to their starting position; and, in Fig. 8d, the work-feeding members have just separated and have commenced their return motion toward the starting position.

In Fig. 7 the two lowermost members shown in cross-section represent the upper electrode member 92 and the upper feed member 94. The insulating block 99 has an outwardly extending shoulder adapted for engagement with the welt crease. The lower supporting member 95 is likewise adapted for engagement with the welt crease. Both members are rounded back from their outer shoulder portions to permit free sliding action of the shoe relative thereto.

Electrical switching is accomplished in a manner analogous to that in Fig. 1, in that the oscillator is made operative only when the electrode member 92 is pressed firmly against the work, as the spring 136 yields to allow relative movement between the head 134 and the vertical rod 135. To this end, a switch 114 is mounted by means of a screw 113 on the head member 134, with the actuating plunger 116 projecting downwardly and resting against the flat head 115 of a screw threaded into the top of the slide member 137. Upon yielding of the spring 136 as the slide member 137 is forced downward by the action of the lever 128, the switch plunger 116 is pressed inward and finally turns on the oscillator 119. The wire connections 117 and 118 between the switch 114 and the oscillator 119 complete the control circuit (not shown) of the latter. The switch causes the oscillator to become inoperative when the electrode member 92 is lifted from the work. The oscillator is connected to the upper and lower electrodes respectively by means of conductors 121 and 98, the former being grounded to the frame of the machine at 120.

Thus this modification also features arrangements by which the electrodes are energized with high-frequency alternating current only during their engagement with the work, and also by which a dwell pressure period is provided for the work areas in which the adhesive has been heated and softened to permit the adhesive to set, and yet without reducing the frequency of the cycle of operation of the machine.

Corresponding adjustments may be made in the machine of Fig. 6 as are possible in the machine of Fig. 1, with reference, for example, to the normal vertical position of the work-feeding member 94, precompression in the spring 111 and positioning of the screw head 115 with respect to the switch plunger 116. Such adjustments are made with the aid of nuts 142, 143, 145 and 146. Likewise the precompression in the spring 136 may be adjusted by means of the collars 139 and 140.

In the operation of either of the foregoing embodiments, the operator inserts the work between the electrode and work-holding members, turns on the driving power and thereafter guides the shoe by maintaining the welt crease thereof continuously against guide members such as the electrode 4 and the support 9. The operation continues progressively around the periphery of the shoe thereby forming a chain or succession of fractional bonds all of which are formed under the same conditions of heat and pressure, and, when taken together, provide a rigid and permanent adhesion uniformly around the shoe.

Having thus described my invention, what I claim as new and desire to secure by Letters Patent of the United States is:

1. In a machine for bonding work pieces, coacting work-gripping members, means for moving at least one of said members to impart a step-by-step motion to the work, a presser foot and a work-supporting member cooperative therewith, said latter members being positioned to the rear of the work-gripping members substantially in the path of movement of the work to engage the work in areas later to be engaged by said former members, means for moving said presser foot toward and away from the work, electrodes embodied in said presser foot and work supporting member and, means for supplying high-frequency electric energy to said electrodes at each step but only during the time the work is engaged by the presser foot, whereby the work gripping members hold together the work pieces previously heated while the work is being advanced for the next heating operation.

2. In a machine for bonding workpieces, a set of cooperating work-contacting feed members, means for moving at least one of said members to impart a step-by-step motion to the work, another set of cooperating work-contacting members, said sets of members being aligned in the direction of movement of the work and engaging overlapping areas of the work, means for operating the latter members to hold the work while the workfeeding members are not gripping the work and to release the work during the workfeeding movement, electrodes embodied in the set of members disposed rearwardly of the other set, and means for supplying high-frequency electric energy to said electrodes to set up an electric field in the work.

3. In a machine for bonding workpieces, a set of cooperating work-contacting feed members, means for moving at least one of said members to impart a step-by-step motion to the work, a set of work-contacting holding members disposed rearwardly of said feed members, said sets of members being aligned in the direction of movement of the work and engaging overlapping areas of the work, means for operating said holding members to hold the work while the workfeeding members are not gripping the work and to release the work during the work-feeding movement, electrodes embodied in said workholding members, and means for supplying high-frequency electric energy to said electrodes to set up an electric field in the work.

4. In a machine for bonding workpieces, a set of cooperating work-contacting feed members, means for moving at least one of said members to impart a step-by-step motion to the work, a set of cooperating work-contacting holding members disposed forwardly of said feeding members, said sets of members being aligned in the direction of movement of the work and engaging overlapping areas of the work, means for operating said work-holding members to hold the work while the work-feeding members are not gripping the work and to release the work during the work-feeding movement, electrodes embodied in said feeding members, and means for supplying high-frequency electric energy to said electrodes to set up an electric field in the work.

5. In a machine for bonding workpieces, a set of cooperating work-contacting feed members, means for moving at least one of said members to impart a step-by-step motion to the work, another set of cooperating work-contacting members, said sets of members being aligned in the direction of movement of the work and engaging overlapping areas of the work, means for operating the latter members to hold the work while the work-feeding members are not gripping the work and to release the work during the work-feeding movement, electrodes embodied in the set of members disposed rearwardly of the other set, and means for supplying high-frequency electric energy to said electrodes at each step but only during the time the work is engaged by the rearward set of members to set up an electric field in the work.

6. In a machine for bonding workpieces, a set of cooperating work-contacting feed members, means for moving at least one of said members to impart a step-by-step motion to the work, a set of work-contacting holding members disposed rearwardly of said feed members, said sets of members being aligned in the direction of movement of the work and engaging overlapping areas of the work, means for operating said holding members to hold the work while the work-feeding members are not gripping the work and to release the work during the work-feeding movement, electrodes embodied in said work-holding members, and means for supplying high-frequency electric energy to said electrodes at each step but only during the time the work is engaged by said work-holding members to set up an electric field in the work.

7. In a machine for bonding workpieces, a set of cooperating work-contacting feed members, means for moving at least one of said members to impart a step-by-step motion to the work, a set of cooperating work-contacting holding members disposed forwardly of said feeding members, said sets of members being aligned in the direction of movement of the work and engaging overlapping areas of the work, means for operating said work-holding members to hold the work while the work-feeding members are not gripping the work and to release the work during the work-feeding movement, electrodes embodied in said feeding members, and means for supplying high-frequency electric energy to said electrodes at each step bu only during the time the work is engaged by said work-feeding electrodes to set up an electric field in the work.

GEORGE T. HART.

REFERENCES CITED

The following references are of record in the file of this patent:

UNITED STATES PATENTS

| Number | Name | Date |
|---|---|---|
| 1,900,573 | McArthur | Mar. 7, 1933 |
| 2,249,855 | Rogers | July 22, 1941 |
| 2,270,891 | Newall | Jan. 27, 1942 |
| 2,371,571 | Crandell | Mar. 13, 1945 |
| 2,379,059 | Ashley et al. | June 26, 1945 |
| 2,385,523 | Marasco | Sept. 25, 1945 |
| 2,401,991 | Walton et al. | June 11, 1946 |
| 2,432,412 | Hacklander | Dec. 9, 1947 |
| 2,446,623 | Welch | Aug. 10, 1948 |
| 2,458,059 | Christensen et al. | Jan. 4, 1949 |
| 2,472,820 | Graham et al. | June 14, 1949 |
| 2,473,143 | Graham et al. | June 14, 1949 |
| 2,477,040 | Brown et al. | July 26, 1949 |
| 2,488,329 | Ridderstrom | Nov. 15, 1949 |
| 2,492,347 | Ashley | Dec. 27, 1949 |
| 2,525,356 | Hoyler | Oct. 10, 1950 |
| 2,551,851 | Reid | May 8, 1951 |
| 2,555,409 | Hosfield | June 5, 1951 |

FOREIGN PATENTS

| Number | Country | Date |
|---|---|---|
| 605,729 | Great Britain | July 29, 1948 |
| 613,419 | Great Britain | Nov. 29, 1948 |